United States Patent
Carstensen

(10) Patent No.: US 9,982,814 B1
(45) Date of Patent: May 29, 2018

(54) SEAL RING AND COUPLING SLEEVE ASSEMBLY

(71) Applicant: Kenneth J. Carstensen, Houston, TX (US)

(72) Inventor: Kenneth J. Carstensen, Houston, TX (US)

(73) Assignee: Kenneth J. Carstensen, Houston, TX (US)

( * ) Notice: Subject to any disclaimer, the term of this patent is extended or adjusted under 35 U.S.C. 154(b) by 0 days. days.

(21) Appl. No.: 15/839,980

(22) Filed: Dec. 13, 2017

(51) Int. Cl.
  *F16L 15/04* (2006.01)
  *E21B 33/10* (2006.01)
  *E21B 17/042* (2006.01)
  *E21B 33/00* (2006.01)

(52) U.S. Cl.
  CPC .......... *F16L 15/04* (2013.01); *E21B 17/042* (2013.01); *E21B 33/10* (2013.01); *E21B 2033/005* (2013.01)

(58) Field of Classification Search
  CPC ........................................... F16L 15/04
  USPC .......................................... 166/242.1
  See application file for complete search history.

(56) References Cited

U.S. PATENT DOCUMENTS

| | | | | |
|---|---|---|---|---|
| 1,938,255 A | * | 12/1933 | Hinderliter | E21B 17/042 285/106 |
| 3,472,533 A | * | 10/1969 | Turner | F16L 15/003 285/258 |
| 5,931,476 A | * | 8/1999 | Ungchusri | F16L 27/08 277/603 |
| 6,695,357 B2 | * | 2/2004 | Schenk | F16L 15/003 277/602 |
| 8,251,139 B2 | | 8/2012 | Carstensen | |
| 8,496,273 B1 | | 7/2013 | Carstensen | |
| 2010/0187808 A1 | * | 7/2010 | Santi | E21B 17/042 285/106 |
| 2013/0300112 A1 | * | 11/2013 | Shand | E21B 17/042 285/355 |

* cited by examiner

*Primary Examiner* — Taras P Bemko
(74) *Attorney, Agent, or Firm* — Mattingly & Malur, PC

(57) ABSTRACT

A seal ring and coupling sleeve assembly usable to join tubing and casing sections includes a rigid coupling sleeve and a resilient seal ring assembly positionable within the coupling sleeve. The seal ring assembly includes a seal ring body and an interior reinforcing ring. The coupling sleeve inner circumference has a plurality of sealing ridge receiving grooves. The outer peripheral surface of the sealing ring body has a plurality of cooperatively shaped and positioned seal ring body sealing ridges. Outer and inner gas grooves extend circumferentially around the outer and inner peripheral surfaces of the seal ring body and are concentric with each other. A plurality of gas ports extend radially between the outer and inner gas grooves of the seal ring body.

8 Claims, 4 Drawing Sheets

SEAL RING AND COUPLING SLEEVE ASSEMBLY

FIELD OF THE INVENTION

The present invention is directed to a seal ring and coupling sleeve assembly for use in coupling together and sealing tubing and casing sections which are frequently used in injection and production oil and gas wells. The seal ring has a generally annular shape with spaced outer sealing ridges, an interior reinforcing ring, a plurality of interior and exterior gas grooves and spaced radial gas ports extending from the seal ring's exterior surface to an interior portion of the seal ring. The coupling sleeve is also generally cylindrical with internal female threads adapted to receive external male threads of tubing and casing sections to be joined together to form a tubing string. The seal ring is positioned in the interior of the coupling sleeve intermediate the sleeve's threaded ends. Such a seal ring and coupling sleeve assembly, in accordance with the present invention, finds particular use joining together tubing and casing sections for use in water alternating gas or WAG procedures in injection wells and in so-called "huff and puff" procedures in production well applications.

BACKGROUND OF THE INVENTION

The present invention is an improvement on applicant's prior U.S. Pat. No. 8,251,139, issued Aug. 28, 2012, and entitled SYSTEM AND METHOD FOR SEALING COUPLINGS IN DOWNHOLE TUBING STRINGS. The disclosure of this prior patent is expressly incorporated herein by reference in its entirety.

Water injection of oil and gas wells, to increase the production efficiency of these wells, has become quite well-known and widely practiced in the oil and gas production industry. In this procedure, water under pressure is injected down an injection well, which injection well is comprised of a large number of tubing or casing sections coupled to each other by coupling sleeves. The injection of such water under pressure has been found to greatly improve the recovery of oil from oil fields and is a generally accepted production process. Increases in well production can also be obtained through the injection of a recovery enhancement fluid into production wells for short periods, and after a soak period, by putting the well back into production.

Applicant's prior patent is directed to a seal ring and coupling sleeve assembly which allows tubing strings to be repeatedly assembled and disassembled without the need to replace individual coupling sleeves and/or seal rings. The prior assembly has enjoyed large commercial acceptance in the industry, primarily because of its ability not to collapse or to blow out or to experience explosive decompression when tubing strings are depressurized or bled down during removal of a tubing string and the disassembly of the tubing string into its respective tubular sections and coupling sleeves. The prior assembly, as described and depicted in applicant's U.S. Pat. No. 8,251,139, utilizes a Teflon® seal ring with a polyether ether ketone or PEEK reinforcing ring, together with a circumferential gas groove and two opposed, radially directed gas ports that bleed off any pressure which may have built up between the outer periphery of the annular seal ring and the inner periphery of the coupling sleeve. As noted above, these seal ring and coupling sleeve assemblies have been widely accepted and used in the water injection production of oil and gas from underground wells. Seal ring failures, due to a build-up of gas pressure, during tubing string disassembly have been virtually non-existent.

The oil and gas production industry has begun utilizing water alternating gas injection or WAG procedures to improve the volumetric sweep efficiency of miscible flooding pressures. In a WAG injection process, water at high pressure is injected, through an injection well, into a particular field, typically for a period of twenty-four hours. This water injection is then stopped and is replaced by the injection of $CO_2$ gas, typically at a correspondingly high pressure, for a period of 30 to 40 hours or more.

Increased utilization of EOR or enhanced oil recovery systems, such as WAG injection, are becoming more commonplace in the oil and gas industry. In such systems, pressures of water and $CO_2$ as high as 4,000 psi or greater are now being used to greatly increase oil recovery. In reef-based limestone formations, the use of alternating water and $CO_2$ or WAG injection procedures, may dissolve the limestone formations. The alternating water and $CO_2$ injection procedure also causes the entrapped oil to become thinner and to flow much more freely. In most instances, dramatic increases in well production have been experienced using EOR systems, such as WAG.

WAG systems are not limited to the use of water alternating with $CO_2$ gas. In some geological formations, the use of $CO_2$ gas may actually have a detrimental effect on oil recovery. For example, in some shale formations, the use of $CO_2$ gas may cause the formations to swell, thereby reducing production. In such situations, natural gas, $CH_4$ may be used as an alternative to $CO_2$.

While this WAG injection process has increased oil field production and recovery, it has also resulted in a failure rate of approximately 12%-15% of applicant's prior seal ring and coupling sleeve assemblies, as disclosed in the aforementioned U.S. Pat. No. 8,251,139. Such seal failure manifests itself as an explosive decompression which may occur during the bleeding down of a well tubing assembly.

One result of the use of WAG injection is the formation of carbonic acid $H_2CO_3$. The formation of this acid is the result of the injection of $CO_2$ gas into a well string which is still wet from the prior use of water under pressure. Although the formation of carbonic acid in tubing and casing sections is attempted to be kept at a minimum by the alternating use of water injection and then $CO_2$ gas injection, the formation of such carbonic acid in the tubing and casing strings is an unavoidable result. The formation of such carbonic acid may have detrimental effects on seal rings and can exacerbate seal ring failures.

Carbon dioxide gas has been determined to permeate typical seal ring materials, such as Teflon®. Over time, the use of WAG injection and similar EOR production techniques results in a buildup of $CO_2$ or other gas under pressure in an area between the outer circumferential surface of a seal ring and the inner circumferential surface of the overlying coupling sleeve. Explosive decompression is the phenomenon that occurs during the bleeding down of wells in which the tubing or casing has been subjected to WAG or other EOR system procedures. In such explosive decompression situations, the pressure which has built up between the seal ring outer circumference and its associated coupling sleeve inner surface, when the pressure in the tubing or casing section is being bled down, will not be released gradually into the interior of the tubing. Instead, it will rapidly and violently deform and distort the resilient material which forms the seal ring assembly, particularly on the field side of the seal ring and coupling sleeve assembly. If the built-up pressure is not properly reduced, by venting into the interior of the tubing pipe string, when the well is depressurized, the result may be such an explosive decompression in the field end, of ones of the coupling sleeves when the individual tubing sections are disconnected from each other. Such a failure of the seal ring assembly in a coupling sleeve, due to such explosive decompression, will render that seal ring and coupling sleeve unsuitable for reuse. The resilient seal ring assembly material, once it has been distorted, will not return to its original shape. Applicant has determined that this inability to properly vent or to release built-up $CO_2$ or other types of gas pressure, particularly in WAG injection field environments, has led to the 12-15% seal failure rate discussed above. This seal failure rate is deemed to be unacceptable and has been the impetus for the development and implementation of the seal ring and coupling sleeve assembly to be described hereinafter, which seal ring and coupling sleeve assembly overcomes the limitations of the prior art.

SUMMARY OF THE INVENTION

The present invention is directed to a seal ring and coupling sleeve assembly which overcomes the limitations of prior seal ring and coupling sleeve assemblies. It finds particular applicability in WAG injection procedures and substantially eliminates any seal ring failures which may have occurred using applicant's prior seal ring and coupling sleeve assembly, which was proven to be very successful in water injection procedures, in the now prevalent WAG injection procedures.

The seal ring in accordance with the present invention utilizes at least three sealing ridges or pressure sealing points which are located on the outer peripheral surface of the seal ring body. Each of the mill end and the field end of the seal ring body has an associated exterior sealing ridge or pressure sealing point. In addition, a third sealing ridge or pressure sealing point is formed on a central region of the outer periphery of the seal ring and overlies an interior reinforcing ring, which, in accordance with the present invention, is preferably formed from a corrosion resistant alloy or CRA. A circumferential gas groove is formed on either side of the central sealing ridge or sealing pressure point. Each of the two spaced gas grooves extend around the entire outer peripheral surface of the seal ring body. Each such gas groove has preferably four radial gas ports spaced equidistantly around the periphery of the seal ring body. The radial gas ports in each of the two gas grooves are placed adjacent their corresponding radial gas port on the other one of the two gas grooves. Cooperatively shaped gas grooves are also formed on the inner surface of the seal ring and generally overlie the interior reinforcing ring. The result of the provision of eight such radial gas ports, extending from their respective outer circumferential gas grooves and each terminating in the interior gas grooves located on the inner surface of the seal ring body, in the area abutted by an outer surface of the CRA interior reinforcing ring, results in the release of any gas pressure which may have built up between the seal ring body outer periphery and the inner surface of the coupling sleeve.

Resilient materials, such as Teflon®, which are used in the formation of the seal ring body of the present invention, are permeable to high pressure gases, such as carbon dioxide gas. Over prolonged period of exposure to $CO_2$ gas and the like, such as will occur during WAG injection of wells, a small amount of $CO_2$ gas, or of another gas at high pressure, will build-up between the outer circumference of the seal ring body and the inner surface of the coupling sleeve, against which the seal ring body abuts. If this built-up high pressure gas is not gradually released or bled into the interior of the tubing string, during work over or disassembly of the tubing string, the result may be seal failure, as a result of explosive decompression, at the field end of the seal assembly. In the present invention, this built-up pressure is properly vented or bled off into the interior of the tubing string by the cooperation of the two exterior gas grooves, the two gas grooves that overlie the interior reinforcing ring and the provision of the multiplicity of circumferentially spaced, radially directed gas release ports. The interior reinforcing ring of CRA has chamfered surface, which cooperate with the radial gas release ports, to provide high pressure gas bleed paths that will allow the high pressure $CO_2$ gas, which may have accumulated between the outer circumferential surface of the seal ring body and the overlying internal surface of the coupling sleeve, to discharge into the interior of the tubing string, without causing an implosion and associated failure of the field end of the seal ring body.

When a tubular element and an associated coupling sleeve in accordance with the present invention, are initially assembled in a pipe yard, prior to their use in a production environment, a mill end of each coupling sleeve receives a cooperating mill end of a tubular element. During the tightening of the coupling ring onto the tubular element mill end threads, a portion of the seal ring body adjacent the mill end ramp of the seal ring will tend to bulge slightly inwardly. This results in an improved cooperation between the mill end exterior gas groove, through the radial gas ports, at the mill end of the seal ring body and through an annular passage which is formed between the interior seal ring gas groove and the chamfered edge of the CRA interior reinforcing ring due to the ability of the now radially inwardly bulged inner surface of the seal ring body to provide a gas venting passage. This gas venting passage will allow any $CO_2$ or other gas under pressure, which may have accumulated between the outer surface of the seal ring body and the inner surface of the coupling sleeve, to safely vent, at a controllable rate, into the interior of the tubular element when a string of such tubular elements is removed from the well and the tubular elements are disassembled or uncoupled from each other. This control of the release of any built-up $CO_2$ or other gas at the high pressure utilized in WAG injection production procedures, will effectively eliminate the incidence of seal ring failures which have occurred in prior art seal ring and coupling sleeve assemblies as a result of the explosive decompression phenomenon. The seal ring and coupling sleeve assembly in accordance with the present invention overcomes the limitations of the prior art. It is a substantial advance in the art.

BRIEF DESCRIPTION OF THE DRAWINGS

While the novel features of the seal ring and coupling sleeve assembly in accordance with the present invention are set forth with particularity in the appended claims, a full and complete understanding of the subject invention may be had by referring to the detailed description of the preferred embodiments, as set forth hereinafter, and as depicted in the accompanying drawings, in which:

DESCRIPTION OF PREFERRED EMBODIMENTS

Figure 1:
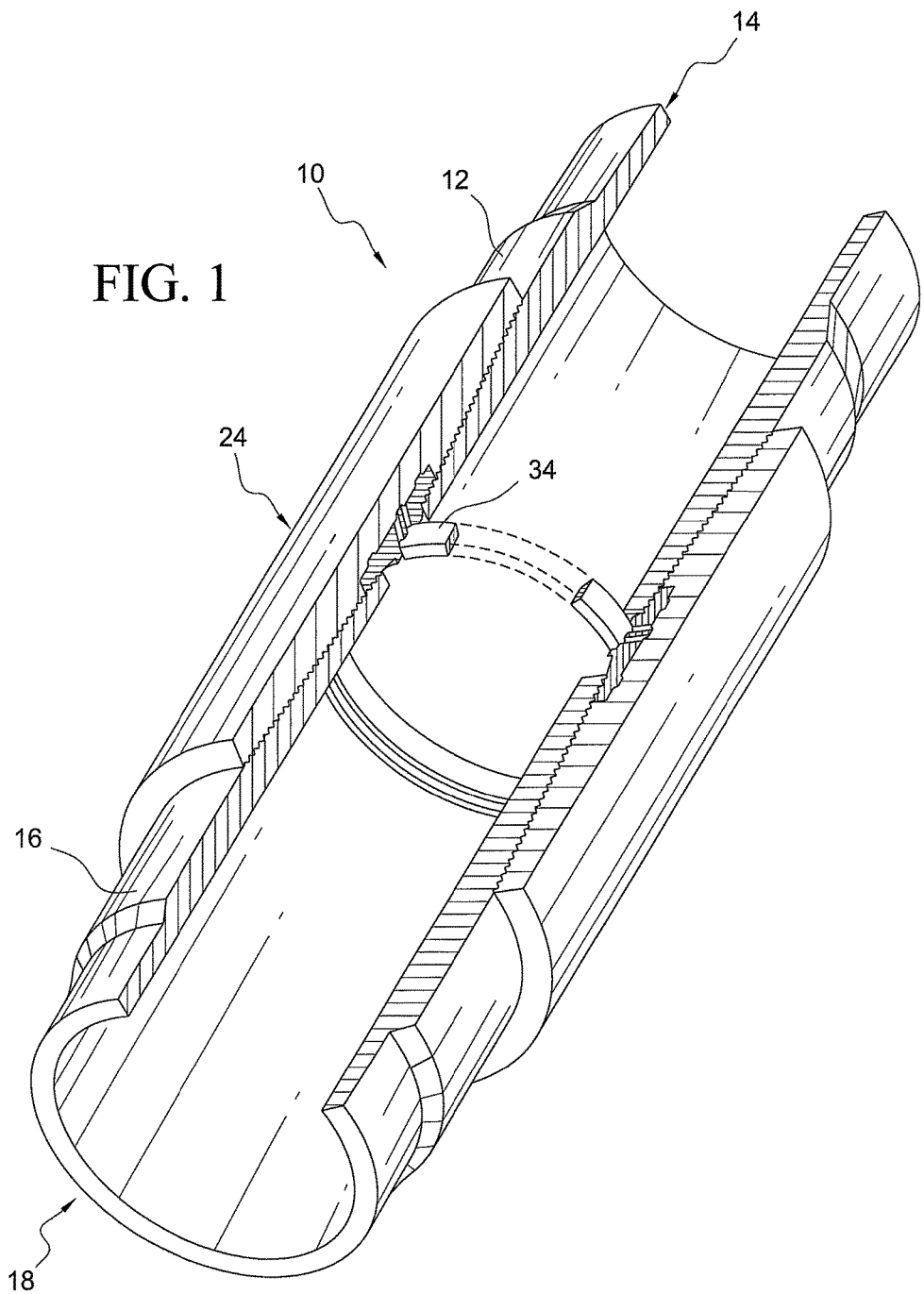
FIG. 1 is a perspective view of a seal ring and coupling sleeve assembly in accordance with the present invention and showing the coupling of two tubing or casing segments together.

Referring initially to FIG. 1, there may be seen, generally at 10, a first preferred embodiment of a seal ring and coupling sleeve assembly in accordance with the present invention. As is disclosed in applicant's prior U.S. Pat. No. 8,251,139B2, the disclosure of which is again expressly incorporated herein by reference, the seal ring and coupling sleeve assembly, generally at 10, is one of multiple such seal ring and coupling seal assembly which find use in modern petroleum production applications. Each such seal ring and coupling sleeve assembly 10 is used to join or connect a pin end 12 of a first or mill end of a first tubing or coupling section, generally at 14, with a pin end 16 of a second or field end of a second tubing or casing section, generally at 18. Details of such a seal ring and coupling sleeve assembly may be seen more clearly in FIGS. 2-7 and will be discussed in detail hereinafter.

Each tubing or casing section 14 or 18 may use round, buttress or other threads, with the examples here chosen being of a tubing string with 8 inch round threads, although the sealing system described herein is equally applicable to tubing and casing sections having other thread configurations. The tubing or casing section, hereinafter mill end tubing section 14, on the mill end side thereof, has pin end male threads 20 which mate with female threads 22 in the associated mill end of a coupling sleeve, generally at 24, often interchangeably called a coupler or collar. The connection, as fully made up in the field site, includes the field end tubing 18, with field end male threads 26 engaged into female field end coupling sleeve threads 28 on the field end side. The tubing 14, secured in the mill end of a coupling 24, is torqued to a predetermined level or to a number of turns, in known fashion. Although make-up to an equal number of turns is shown by way of example in the figures, it should be noted that the mill end side connection, once completed, is substantially invariant because make-up and break-out is effected on the opposite, field side. On the field end side, the depth of the penetration of the pin end 16 into the coupling sleeve and seal ring varies because the greater of number of times the connection is made up, the greater depth of penetration of the field end pin 16, which is usually needed for proper sealing as the seal deforms.

Figure 2:
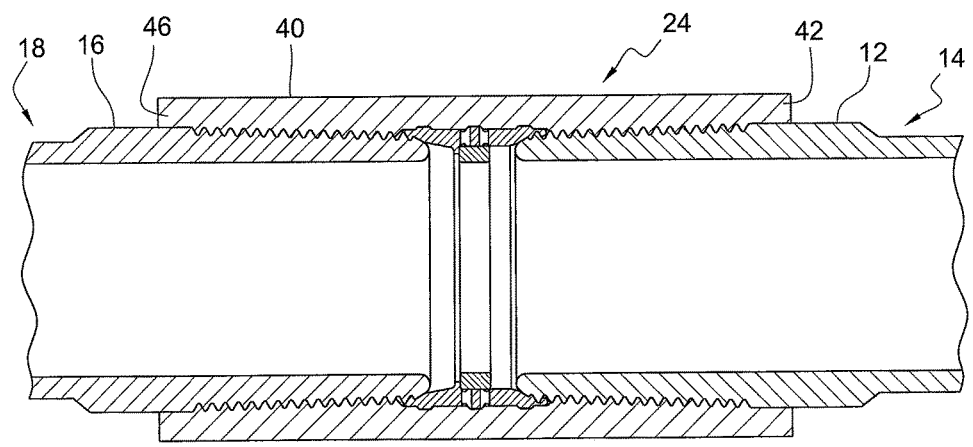
FIG. 2 is a cross-sectional view of the seal ring and coupling sleeve assembly depicted in FIG. 1 and showing the fastening together of two tubing or casing sections.
Figure 3:
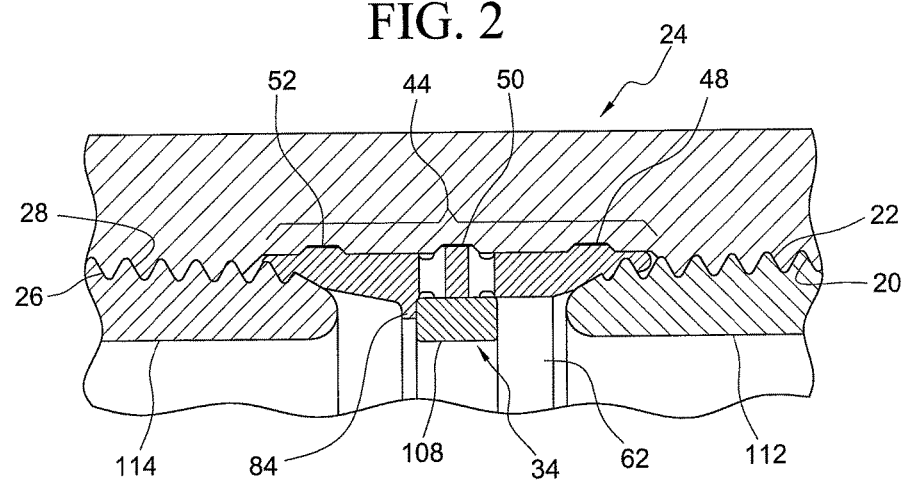
FIG. 3 is an enlarged cross-sectional view of a central portion of the seal ring and coupling sleeve depicted in FIG. 2.
Figure 4:
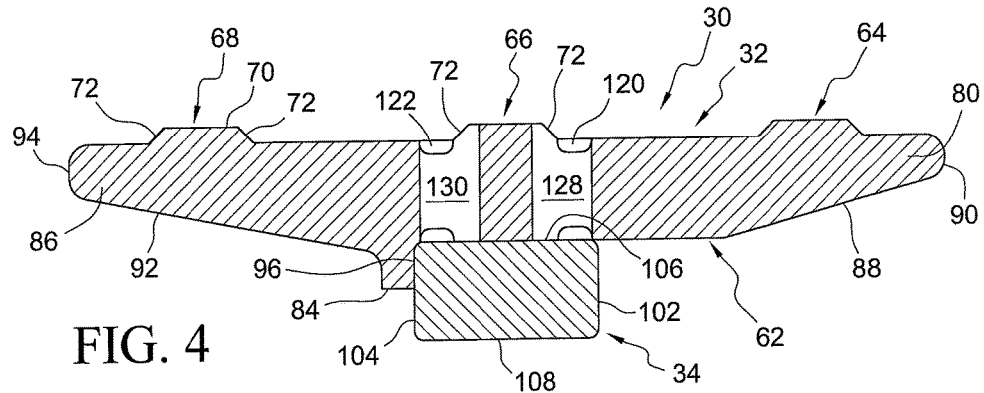
FIG. 4 is a cross-sectional view of a first preferred embodiment of the seal ring in accordance with the present invention.
Figure 5:
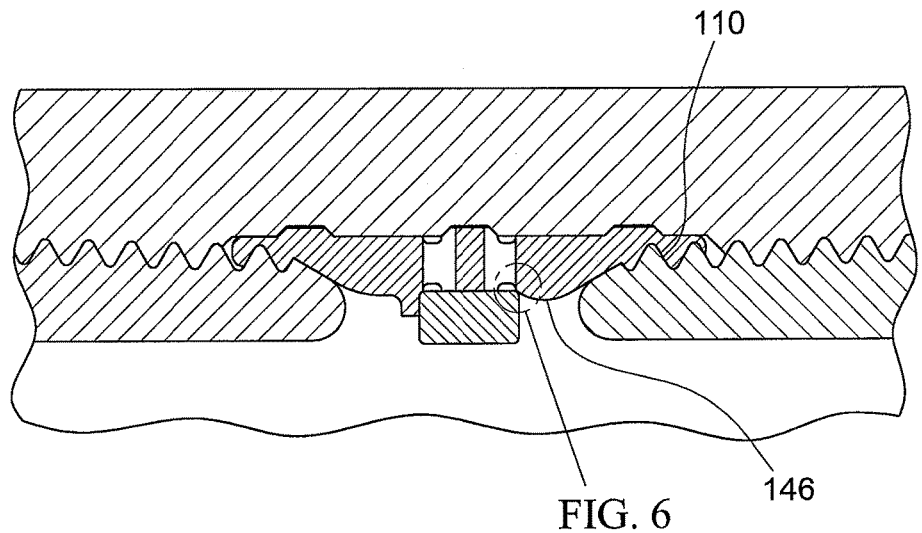
FIG. 5 is a cross-sectional view similar to FIG. 3 and showing a distortion of the seal ring body during make-up of a mill end of the seal ring and coupling sleeve assembly.

The first preferred embodiment of the seal ring and coupling sleeve assembly, generally at 10 in FIGS. 1-6, in accordance with the present invention, is comprised generally of the outer coupling sleeve 24, and a seal ring assembly, generally at 30, as seen most clearly in FIG. 4. The seal ring assembly 30 includes a seal ring body, 32 and an interior reinforcing ring, generally at 34, of a corrosion resistant alloy or CRA. These two portions of the seal ring and coupling sleeve assembly, generally at 10, and in accordance with a first preferred embodiment of the present invention, will be discussed in greater detail below.

The coupling sleeve, generally at 24, has, as seen in FIGS. 1 and 2, a generally cylindrical shape that is defined by a coupling sleeve outer circumferential surface 40 with a mill end 42, the coupling sleeve mill end female threads 22, a coupling sleeve interior seal ring assembly receiving section 44, and a field end 46 that includes the field end coupling sleeve female threads 28. As is understood in the relevant field of usage, such coupling sleeves are typically made of steel and have a range of diameters and thread sizes and configurations, all of which are described in greater detail in applicant's prior U.S. Pat. No. 8,251,139B2. The coupling sleeve's mill end 42 is so designated, as is known in the art, because the pin end 12 of the first tubing section 14 is inserted into the mill end 42 of the coupling sleeve 24 and the coupling sleeve 24 is tightened or torqued onto the male threads 20 of the pin end 12 of the first tubing section 14 in a controlled manner. This make-up is often performed at an area separated from the actual well site at which the tubing sections will be utilized in and is thus designated as the "mill" end. Such nomenclature is well-known in the art.

The coupling sleeve interior seal ring assembly receiving section, generally at 44, is spaced generally at the axial or longitudinal middle of the coupling sleeve 24 and intermediate the coupling sleeve mill and field ends. As depicted in FIGS. 1-3, for example, this coupling sleeve interior seal ring assembly receiving section 44 includes a plurality of spaced seal ring body sealing ridge receiving grooves. Three such seal ring body sealing ridge receiving grooves are depicted in the first preferred embodiment. These spaced grooves include a mill end coupling sealing ridge receiving groove 48, a central coupling sealing ridge receiving groove 50 and a field end coupling sealing ridge receiving groove 52. These three sealing ridge receiving grooves, 48, 50 and 52 are configured and dimensioned to receive complimentarily shaped seal ring body sealing ridges, as will be discussed shortly. The interior of the coupling sleeve terminates, at its field end 46, in the female field end coupling sleeve threads 28. It will again be understood that apart from the structure of the coupling sleeve interior, intermediate seal ring receiving section 44, the overall structure, shape and function of the coupling sleeve 24 is generally conventional.

Seal ring assembly, generally at 30, and as may be seen most clearly in FIG. 4, has the seal ring body, generally at 32, which also has a generally cylindrical or annular shape. Seal ring body 32 is dimensioned and configured to be receivable and securable in the cooperative shaped coupling sleeve interior, intermediate seal ring receiving section 44 of the coupling sleeve, generally at 24. Seal ring body 32 is preferably made from a resilient seal material, such as TEFLON®. The seal ring body 32 has an outer circumferential surface, generally at 60, and which is primarily cylindrical, and a compound seal ring inner surface 62 which will be defined by four separate structures or sections, each of which will be discussed below.

An outer circumferential surface, generally at 60, of the seal ring body 32 is provided with a plurality of spaced seal ring body sealing ridges, with three such seal ring body sealing ridges being depicted in the first preferred embodiment, and including a mill end sealing ridge 64, a central sealing ridge 66 and a field end sealing ridge 68. In the embodiment of the present invention depicted in detail in FIG. 4, each of these three seal ring sealing ridges 64, 66 and 68 is generally trapezoidal in shape, each being defined by a generally planar top or outer peripheral surface 70, a pair of angled or inclined side wall surfaces 72 and a base portion which is formed integrally with the rest of the resilient body 32 of the seal ring assembly 30. These three seal ring sealing ridges 64, 66 and 68 have a shape which is configured to be firmly and sealingly received in the correspondingly shaped coupling sleeve interior seal ring receiving grooves 48, 50 and 52, respectively. While the cooperating shapes of the coupling sleeve interior seal ring receiving grooves 48, 50, 52 and of the seal ring sealing ridges 64, 66, 68 as depicted in the first preferred embodiment, are believed to be particularly relevant for use in the present invention, it is within the scope of the present invention that other numbers and cooperating shapes of sealing ridge receiving grooves and sealing ridges could be utilized.

A pair of land areas are defined on the outer circumferential surface 60 of the seal ring body. These two land areas are a mill end land area 76 and a field end land area 78. The mill end land area 76 is defined as the portion of the outer circumferential surface 60 of the seal ring body 32 between the mill end sealing ridge 64 and the central sealing ridge 66. The field end land area 78 is defined as the portion of the outer circumferential surface 60 of the seal ring body which is located between the central sealing ridge 66 and the field end sealing ridge 68 of the seal ring body 32.

The interior surface of the seal ring body 32 has, as noted above, four individual sections. As seen in FIG. 4, these include a mill end wing 80, a central seating surface 82, a shoulder 84 and a field and wing 86. The mill end wing 80 has an inclined mill end ramp surface 88 which tapers radially outwardly from the central seating surface 82 to a mill end nose 90 of the mill end of the seal ring 30. Central seating surface 82 is asymmetrically located on the interior surface of the body 32 of the seal ring. The radially inclined ramp 88 of the mill end wing 80 of the seal ring body 32 is shorter than is the corresponding field end ramp surface 92 of the field end wing 86 of the seal ring body 32. The field end ramp 92 also has a radially increasing tapered shape and terminates at a field end nose 94 of the seal ring, generally at 30.

The central seating surface 82 of the radial inner portion of the seal ring body 32 is generally cylindrical and planar and is generally parallel to the outer cylindrical surface 60 of the seal ring body 32. The sealing ring engaging shoulder 84 is located at the field end of the central seating surface 62, as is shown in FIG. 4. Shoulder 84 is generally rectangular in cross-section and includes a reinforcing ring abutting surface 96. An inner circumference of the sealing ring engaging shoulder 84 has a radius which is less than the radius of the central seating surface 82 and of the tapering radii of the mill end ring ramp 88 and of the field and ring ramp 92.

An interior reinforcing ring, generally at 34, is sized to slide into place on the central seating surface 82 of the seal ring body 32. In accordance with the present invention, the interior reinforcing ring, generally at 34, is preferably formed of a corrosion-resistant alloy or CRA. Such an alloy can consist of, for example, chrome, stainless steel, cobalt, nickel, iron, titanium and/or molybdenum. When combined, such metals can provide corrosion resistance more than other compounds, such as carbon steel. This type of an alloy offers reliable protection from corrosion and is preferred for forming the interior reinforcing ring 100 in accordance with the present invention.

Interior reinforcing ring, generally at 34, is generally rectangular in cross-sectional shape and is defined by a mill end side wall 102, a field end side wall 104, an outer radial surface 106 and an inner radial surface 108. As seen in FIG. 4, and even more clearly in FIG. 6, these planar wall surfaces 102, 104, 106 and 108 of the interior reinforcing ring 34 join each other, not as square or sharp corners, but rather at angled or chamfered surfaces, such as the chamfered surface depicted at 110 in FIG. 6. The purpose of these chamfered or beveled surfaces 110 will be discussed in greater detail subsequently. The inner radial surface 108 of the interior reinforcing ring 34 is generally aligned with inner wall surfaces 112 and 114 of the mill end tubing or casing section 14 and the field end tubing or casing section 18, respectively. This co-planar arrangement facilitates laminar flow of water, gas and other fluids through the coupling sleeve.

Figure 7:
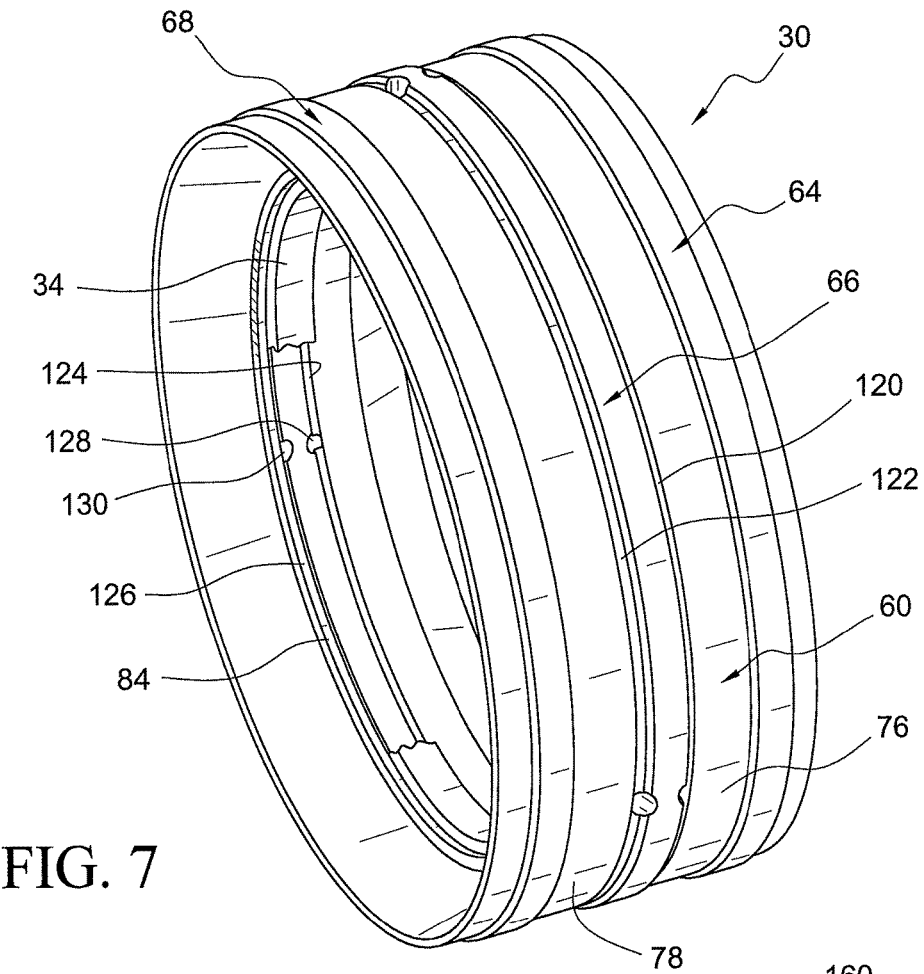
FIG. 7 is a perspective view of a seal ring in accordance with the present invention.

The seal ring body 32, generally at 32, as may be seen in FIG. 2, and most clearly in FIG. 7 of the drawings, has a pair of circumferentially extending, axially spaced outer gas grooves 120, 122 formed on the other surface of the seal ring body 32 and adjacent the central sealing ridge 66. As may best be seen in FIG. 4, the central sealing ridge 66 of the coupling sleeve terminates, at the radially inner portion of its side walls 72, at the two axially spaced, outer gas grooves 120, 122. These two outer gas grooves 120, 122 are formed in the outer surface of the seal ring body 32 and typically have a somewhat semi-circular or elliptical shape in cross-sections, again as may be seen most clearly in FIG. 4. These outer gas grooves 120, 122 each extend around the entire peripheral surface of the outer periphery of the seal ring body 32 and are recessed into the seal ring body outer circumferential surface 60. A pair of circumferentially extending, axially spaced inner gas grooves 124, 126 underlie, and are generally concentric with, the circumferentially extending outer gas grooves 120, 122. A plurality of pairs of mill side and field side radial gas ports, 128 and 130, respectively are provided in the seal ring body 32 and extend between the respective outer gas grooves 120, 122 and inner gas grooves 124, 126 respectively. In a preferred embodiment of the present invention, there are four such pairs of mill end and field end gas ports 128 and 130. These are equidistantly spaced from each other around the circumference of the seal ring body. 32 Each gas port 128, 130 extends between an associated one of its axially spaced mill or field side outer gas grooves 120, 122 and its correspondingly axially spaced one of its mill or field end inner gas grooves 124, 126. Each such gas port 128, 130 is preferably formed as a radial cylindrical bore extending from an outer gas groove 120, 122 through the seal ring body 32 to its associated inner gas groove 124, 126.

In the assembly of a seal ring and coupling sleeve assembly in accordance with the present invention onto a tubing or casing section, the male threads 20 of a mill end 12 of a tubing or casing section 14 are engaged with the female threads 22 on the mill end of the casing sleeve 24. These male threads 20 are received in the mill end wing 80 of the seal ring body, generally at 32. As the tubing string and casing sleeve are screwed together, under the application of a pre-selected force, the male end threads 20 of the tubing or casing section 14 will cut corresponding female threads 140 into the mill end ramp surface 88 of the mill end wing 80 of the seal ring body 32. The formation of these female seal ring mill end female threads 140 may be seen in FIGS. 2, 5 and 7, for example. The tightening together of the mill end of the coupling sleeve 24 and the mill pin end 12 of the tubing or casing section 14 is accomplished with a force greater than that which will be used to connect field ends of tubing or casing sections to their associated field ends of the casing sleeves. This is done to ensure that during repeated possible make-up and break-out of the tubing sections, that the disconnections will always take place at the field end of the associated seal ring and coupling sleeve assemblies. As is known in the art, each successive tubing string make-up will cause the field end pin end 16 of a tubing or a casing section to use its male threads to cut associated female threads in the field end of the seal ring body to an ever increasing depth or length of penetration. That is why the field end ramp 92 of the field end wing 86 of the seal ring body 32 has an axial length which is greater than a mill end ramp 88 of the mill end wing 80 of the seal ring body 32.

Figure 6:
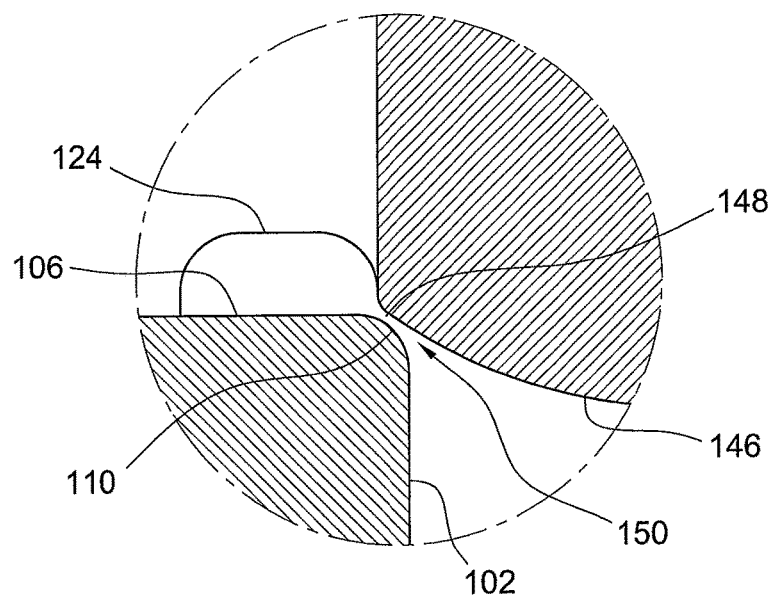
FIG. 6 is an enlarged cross-sectional view of the encircled portion of FIG. 5.

Referring now to FIGS. 6 and 7, the threading-in of the mill pin end 12 of a tubing or a casing section 14 into the mill end of the coupling sleeve, together with the engagement of the pin end male threads 20 with the mill end ramp 88, will slightly deform the central seating surface 82 of the seal ring body 32. This is due to the resilient nature of the material, such as TEFLON® which is used to form the seal ring body 32. This slight deformation will cause the central seating surface 82 of the seal ring body 32 to bulge slightly radially inwardly, as represented at 146 in FIGS. 5 and 6. Such a radially inward bulging 146 of the central seating surface 82 of the seal ring body 32 will unseat an edge 148 of the seating surface, defined by a mill end side of the mill end inner gas groove 124, to separate from a chamfered surface 106 of the interior CRA reinforcing ring. This unseating facilitates the provision of a primary gas leak passage 150.

The deflection of the field end wing 86 of the seal ring body 32, and of its ramp surface 92, to the extent that such deflection occurs, may also facilitate the formation of a secondary gas leak passage between an edge of the field end inner gas groove 126 and the wall surface 96 of the shoulder 84. Again, this secondary gas leak passage is made more effective by the beveled or chamfered edge surfaces of the interior reinforcing ring 100 of CRA.

During pressurization of a well, during either a WAG procedure in an injection well or an oil recovery enhancement procedure, such as a so-called "huff and puff" procedure in a production well, high pressure fluids are directed down through the tubing or casing string. This increase in pressure will result in the formation of an area of high pressure in the seal ring and coupling sleeve assembly, in accordance with the present invention, in the interstitial area defined between the mill end land 76, the field end land 78, both of the seal ring body 32, and the inner circumferential surface of the coupling sleeve interior seal ring assembly receiving surface 44. This fluid under pressure enters into these interstitial areas initially through the inner gas grooves 124; 128, through the radial gas ports 128; 130 and through the outer gas grooves 120; 122. Once these interstitial areas have received the high pressure fluid, there is no circulation of that high pressure fluid into or out of these areas, so long as the tubing or casing string is held under pressure. The fluid which accumulates in these interstitial areas forms a dead corrosion cell. There is no fluid circulation and no renewal of electrolytes. When the tubing or casing is being bled down, and the pressure is being released, this high pressure fluid in these interstitial areas will be released, in a non-destructive manner, through the outer gas grooves 120; 122, passing through the radial gas ports 128; 130, to the inner gas grooves 124; 126 and through the primary gas leak passages 150 and also through any secondary gas leak passages.

Figure 8:
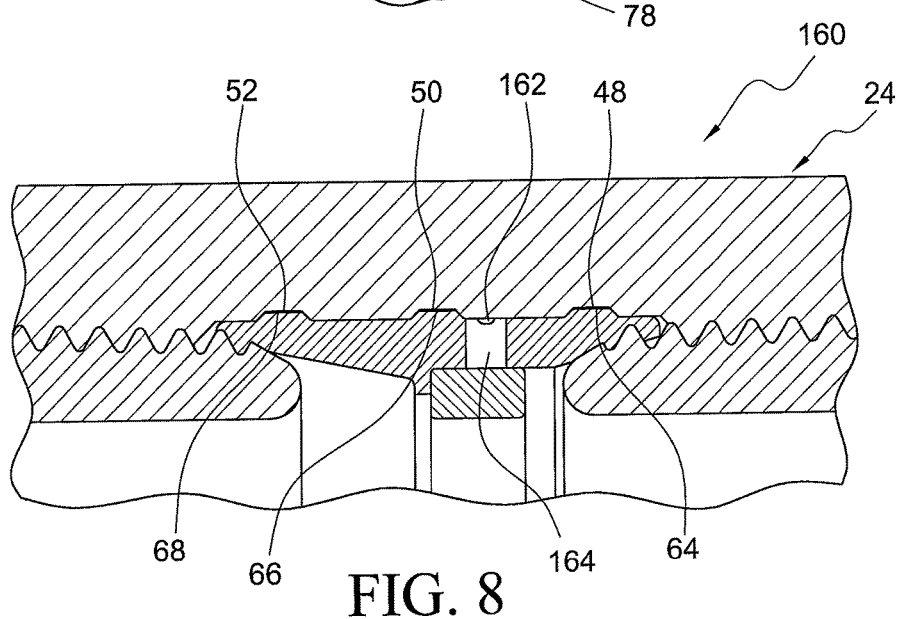
FIG. 8 is a cross-sectional view of a second preferred embodiment of the seal ring and coupling sleeve assembly in accordance with the present invention.

A second preferred embodiment of the seal ring and coupling sleeve assembly, in accordance with the present invention, may be seen generally at 160 in FIG. 8. This second preferred embodiment 160 is somewhat similar to applicant's prior seal ring and coupling sleeve assembly, as disclosed in U.S. Pat. No. 8,251,139 B2. In this second preferred embodiment, the coupling sleeve generally at 24 utilizes the three cooperating mill end, central and field end coupling sleeve grooves 48, 50 and 52 of the first preferred embodiment of the subject invention. These three coupling sleeve grooves receive the three cooperating mill end, central and field end sealing ridges 64, 66 and 68 of the seal ring body 34 of the first preferred embodiment. A single outer circumferential gas groove 162 is provided in this second preferred embodiment and cooperates with two diametrically spaced radial gas ports 164, generally in accordance with the prior seal ring and coupling sleeve assembly, as disclosed in applicant's prior U.S. Pat. No. 8,251,139B2. The interior reinforcing ring of the second preferred embodiment of the subject invention may utilize the PEEK material disclosed in applicant's prior U.S. patent or may use a corrosion-resistant alloy CRA, in accordance with the present invention. This second preferred embodiment 160 is a hybrid structure which incorporates some of the advances made to arrive at the first preferred embodiment of the seal ring and coupling sleeve assembly of the present invention into the prior seal ring and coupling sleeve assembly in accordance with applicant's prior U.S. patent. This second preferred embodiment of the seal ring and coupling sleeve assembly is intended primarily for utilization in water injection wells where the prior seal ring and coupling sleeve assembly has performed admirably. This second preferred embodiment incorporates some of the novel features of the subject invention into the prior seal ring and coupling sleeve assembly disclosed in applicant's prior U.S. patent.

As discussed previously, one of the consequences of enhanced oil recovery or EOR procedures, such as water alternating gas or WAG treatment of injection wells and production wells is the accumulation of gas under pressure in annular spaces between the seal ring assembly and the coupling sleeve in couplings of the type used to connect tubing or casing sections. The resilient material, such as TEFLON® or the like, which is used to form the seal ring body of such couplings, is or becomes permeable to the high pressure gas, such as $CO_2$ or $NH_4$, which is the gas component of the WAG procedures to accomplish EOR. When a tubing or casing string is to be removed from a well bore, such as for possible maintenance, the pressure in the tubing string has to be relieved or bled down. Such bleeding down is theoretically done over a finite time period to facilitate the leaking off of any built-up gas under pressure which may have accumulated in the interstitial areas between the porous seal ring body and the surrounding coupling sleeve. In actual practice, the tubing string is apt to be bled off or down in a greatly reduced period of time. The effect of such rapid reductions in the pressure in the tubing or coupling string has been so-called explosive decompression of coupling sleeves and specifically the blowing out of the seal ring body on the field end of such couplings. Once the coupling assembly has experienced such an explosive decompression event, it is no longer usable until the now deformed seal ring has been removed and replaced with a new seal ring. The effects of the explosive decompression on a seal ring body are not self-correcting. The American Petroleum Institute (API) and the National Association of Corrosion Engineers (NACE) have recommended and established best practices for the bleeding down of wells. These established practices and procedures should always be followed.

In accordance with the first preferred embodiment of the subject invention, as depicted in FIGS. 1-7, when a tubing or casing string is to be removed and bled down, any accumulated gas under pressure in the coupling assembly will be able to leak out into the tubing or casing string at a relatively reduced rate through the primary and secondary gas leak passages. This eliminates the explosive decompressions that have become an issue with the use of prior seal ring and coupling sleeve assemblies. The presence of the two axially spaced and aligned outer and inner circumferential gas grooves, the utilization of a greater number of radial gas ports, the provision of the interior reinforcing ring of CRA with beveled or chamfered edges, and the ability of the resilient seal ring body to unseat itself from its engagement with the interior reinforcing ring, particularly in the area of the mill end side edges of the inner gas groove, have eliminated the possibility of seal failures caused by explosive decompression.

While preferred embodiments of a seal ring and coupling sleeve assembly in accordance with the present invention have been set forth fully and completely hereinabove, it will be apparent to one of skill in the art that various changes in, for example, the sizes of the tubing and casing sections, the specific thread types, the compositions of the casing and tubing sections and coupling sleeves, and the like could be made without departing from the true spirit and scope of the present invention which is accordingly to be limited only by the appended claims.

The invention claimed is:

1. A seal ring and coupling sleeve assembly comprising:
   a generally cylindrical rigid coupling sleeve having an outer peripheral coupling sleeve surface and an inner peripheral coupling sleeve surface including a threaded mill end and a threaded field end;
   a plurality of circumferentially extending, axially spaced, coupling sleeve sealing ridge receiving grooves formed in the inner peripheral surface of the rigid coupling sleeve and including a mill end coupling sleeve sealing ridge receiving groove, a central coupling sleeve sealing ridge receiving groove and a field end coupling sleeve sealing ridge receiving groove;
   a seal ring assembly positionable in the coupling sleeve and having a seal ring body and an interior reinforcing ring, the seal ring body including a seal ring body outer peripheral surface and a seal ring body inner peripheral surface, the interior reinforcing ring being positioned within the seal ring body and in contact with the seal ring body inner peripheral surface;
   a plurality of spaced seal ring body sealing ridges formed on the outer peripheral surface of the seal ring body and including a mill end seal ring body sealing ridge, a central seal ring body sealing ridge and a field end seal ring body sealing ridge, each such seal ring body sealing ridge being adapted to be received in a corresponding one of the coupling sleeve sealing ridge receiving grooves when the seal ring assembly is placed in the coupling sleeve;
   first and second circumferentially extending, axially spaced outer gas grooves in the outer peripheral surface of the seal ring body and adjacent spaced side surfaces of the central seal ring body sealing ridge;
   first and second circumferentially extending axially spaced inner gas grooves on the seal ring body inner peripheral surface and generally concentric with the outer gas grooves; and
   a plurality of radially extending gas ports extending between the outer gas grooves and the inner gas grooves.

2. The seal ring and coupling sleeve assembly of claim 1 wherein the interior reinforcing ring is a corrosion resistant alloy.

3. The seal ring and coupling sleeve assembly of claim 1 wherein the central seal ring body sealing ridge overlies the interior reinforcing ring.

4. The seal ring and coupling sleeve assembly of claim 1 wherein the interior reinforcing ring has chamfered radial outer edges.

5. The seal ring and coupling sleeve assembly of claim 4 wherein the chamfered radial outer edges of the interior reinforcing ring cooperate with the first and second inner gas grooves on the seal ring body inner peripheral surface.

6. The seal ring and coupling sleeve assembly of claim 5 wherein the seal ring body is resilient and is deformable to form a gas passage between one of the first and second inner gas grooves and one of the chamfered radial edges of the interior reinforcing ring.

7. The seal ring and coupling sleeve assembly of claim 1 wherein there are three coupling sleeve sealing edge receiving grooves and three seal ring body sealing ridges.

8. The seal ring and coupling sleeve assembly of claim 1 wherein the radially extending gas ports are arranged in pairs spaced around the periphery of the seal ring body.

* * * * *